UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PRODUCTION OF PLASTIC SUBSTANCE.

1,111,288. Specification of Letters Patent. Patented Sept. 22, 1914.

No Drawing. Application filed August 4, 1913. Serial No. 782,942.

*To all whom it may concern:*

Be it known that I, JONAS W. AYLSWORTH, a citizen of the United States, and a resident of East Orange, county of Essex, State of New Jersey, have invented certain new and useful Improvements in the Production of Plastic Substances, of which the following is a description.

My invention relates to a novel process for forming compositions comprising phenolic condensation products suitable for molding into desired forms and objects.

In my application entitled "Plastic molding composition and method of producing same," Serial No. 780,453, filed July 22, 1913, I have described a process for producing plastic compositions which in one form, comprises the formation of an alkaline-water solution of a phenol resin, or fusible, soluble, phenol-formaldehyde condensation product, by the aid of an oxid or hydroxid of an alkali metal or alkaline earth metal. Having obtained such a water solution, in the said form of my process described in said application, the same is mixed with a fibrous or cellular filling body, which is thereby caused to swell and absorb the alkaline solution. The alkali in the solution is then neutralized by an acid, as described, with the result that water-insoluble, insulating, precipitates are formed, in and about the pores and fibers of the filling body, of the phenol resin and of a salt of the alkali used in the solution. Or, if no filling body is used, the neutralization of the alkaline water solution results in the formation of the same two precipitates, the resultant intermixed mass being valuable as a binder, or to be used by itself as a plastic composition, either with or without the addition of a methylene-containing hardening agent adapted to cause the further hardening of the mass to infusibility upon subsequent heating.

In the present application will be described a principal process in which phenol and formaldehyde are mixed initially with water and an alkaline earth, caused to react to form a substance comprising phenol-alcohols in alkaline water-solution, neutralized, and the alkali precipitated as a water-insoluble, insulating salt. This process is carried out either with or without the use of a filling material, and if the same is used, the neutralization of the solution may take place before or after the filler is added. After neutralization the salt of the alkali thereby formed may be readily eliminated, or may remain as a useful ingredient of the mass as a filler. In this process the phenol-formaldehyde reaction product is not precipitated by the neutralization of the alkali as was the phenol resin in my application referred to as above, and, while the present process utilizes some of the steps of my other process referred to, it is, as a whole, a quite different method. In the present process the mass, after neutralization, may be dried and subsequently molded or compressed and hardened by further reaction with heat, and the addition of a further amount of a methylene-containing ingredient, if desired, to form a desired article.

My object is accordingly to provide an improved process for the formation of phenolic condensation products, of the character outlined above and thereby to form plastic compositions of highly desirable properties, all as will more fully appear hereinafter in the following specification and appended claims.

My present invention, as well as that described in my other application referred to, is adapted to form two classes of compositions; one a composition which requires only to be compressed in heated condition, by which means a compact, hard mass is obtained without any conversion into a nonplastic or infusible state, and the other, a composition which is converted by further reaction under the application of heat or heat and pressure into a non-plastic, infusible and insoluble condition. The first class of compositions are rapid molding, the second class ordinarily require more time in molding, but are better adapted for uses requiring high heat resistance, chemical inertness, high dielectric strength and great mechanical strength.

In my principal process, briefly referred to above, I first form a water-soluble phenol-formaldehyde condensation product by reaction between phenol or cresol and formaldehyde, in the presence of an alkaline earth metal oxid or hydroxid, either in small or large amounts, that is, in less than an equimolecular proportion of the alkaline earth metal oxid, or in a full equi-molecular proportion of the same. The product thus formed, is, as stated, largely composed of phenol-alcohols. By thus forming the said product in water-solution, from the initial ingredients, the necessity of first forming a phenol resin and then dissolving the same in water solution, by the aid of an alkali metal or alkaline earth metal oxid, as in my other application referred to, is obviated.

The neutralization of the alkaline earth metal oxid used in this process may be effected either prior to compounding the mass with a suitable filler, if the same is desired in the plastic mass finally produced, or subsequent thereto. The neutralization is effected by an acid which will form a non-water-soluble, insulating, salt with the alkaline earth metal oxid used, suitable acids being sulfuric and carbonic acids. The reaction product in its water solution may be entirely freed from the alkaline earth, by precipitation with sulfuric or carbonic acid, followed by filtration, and may thereafter be used as a binding agent in the formation of a plastic composition, or as a lacquer or varnish which is capable of conversion, after drying, into a more highly condensed non-water soluble resinous product, or into a hard infusible, insoluble condensation product, dependent on the proportion of formaldehyde or methylene groups in the composition entering into reaction.

The use of basic oxids or hydroxids as agents of condensation with phenols and formaldehyde in widely varying percentages is well known in this art but the usefulness of such condensing agents has been very limited because their presence in the finished product impairs the quality of the product, and furthermore, they cannot be readily removed by any of the well known working methods. When their removal has been attempted, a certain proportion of the condensing agent has remained in the product, with harmful results for many purposes to which the composition may be put. It has been proposed, because of the recognized difficulty of removing the condensation agents from the product, to employ the same in very small proportions. By my present invention, I am enabled to use a substantial proportion of condensing agent, in the form of an alkaline earth metal oxid and to overcome the previous objections to the use of the same given above, by converting it into an insoluble, insulating salt, or precipitate, which may remain in the product or may be removed by filtration after the basic oxid has performed its function of accelerating condensation and of forming a water-soluble product. The use of bases in considerable proportion favors the production of oxy-benzyl-alcohols which are soluble in water and in water containing free phenols, and these products are capable of further reaction to form resinous non-water soluble bodies and hard, infusible, insoluble, bodies.

I have found that when phenol and formaldehyde are caused to react in equi-molecular proportions in the presence of a substantial proportion of an alkaline agent, such as lime, there always results a considerable proportion of free phenol in the product, even though the reaction was so conducted that there is no evaporation loss of formaldehyde. Further, in order to reduce the proportion of this free phenol and form a more or less complete condensation of the phenol to phenol alcohols, a large excess of formaldehyde above the equi-molecular proportion must be used. I have observed that under the above conditions, that is, where a large excess of formaldehyde is used, not only are phenol alcohols formed, but also a part of the formaldehyde is condensed by the aldol condensation to formose, and is lost or rendered ineffective in the main reaction desired. The disappearance of formaldehyde in this manner has led some investigators to assume that formaldehyde combined with phenol in greater than equi-molecular proportion, one investigator concluding that in this reaction one phenol molecule is present to every two molecules of formaldehyde. My experiments have demonstrated, however, that the excess formaldehyde used in such cases has largely been transformed into formose-like impurities, as stated. I therefore find it advisable when it is desired that the end product formed should contain the minimum amount of such impurities and also for the purpose of economy in the use of formaldehyde, to keep the proportion of the formaldehyde used in relation to the phenol at or below the equi-molecular proportion, to then determine the amount of free phenol in the solution after completion of the reaction, and to add a sufficient amount of hexa-methylene-tetra-amin or other body containing methylene-groups capable of reaction, to combine with the free phenol.

As has been noted above, the product formed in water-solution, according to my present invention, differs from that contained in water-solution described in my other application Serial No. 780,453 referred to, in that it continues in water solution after the precipitation of the alkaline earth as described, by carbonic acid gas. It further differs chemically in that it consists largely of phenol alcohols, whereas the product in solution in my other application referred to, comprises a water-soluble alkaline salt of a complex phenolic resin, contained in water-solution, the resin itself being precipitated together with the salt of the alkaline earth metal when the latter is combined with carbonic acid.

As an example of a suitable procedure in carrying out my present method, when it is desired to form a composition of the first class mentioned above, that is, one which is not converted by heat into a non-plastic or infusible state, but which, upon being compressed in heated condition forms a compact, hard mass, the following may be cited: 3 to 27 parts of calcium oxid are hydrated to equal about 200 parts of milk of lime and mixed with 100 parts of phenol. From 60 to 75 parts of commercial 40 per cent. formaldehyde solution is then mixed with the phenol-lime solution which should be at a temperature not over 55° C. The reaction then proceeds at this temperature and is complete in from one-half hour to three hours. During the reaction, the temperature rises and the containing vessel should be cooled to prevent the temperature from rising above 66° C. The product thus formed, which is still in water-solution, is then mixed with from 70 to 300 parts of filling material, which may be a wood flour, asbestos fiber, cotton flocks, or any of the well known inert powdered fillers or mixtures of the same. After mixing, the moist mass is exposed to carbon-dioxid until the mass is neutralized, the completion of neutralization being determined by suitable indicative tests or it may be noted by observing the completion of absorption of the gas by the mass. The mass is then dried at a temperature of from 100 to 120° C. and may subsequently be molded in closed molds, or it may be compressed into slabs or other suitable forms previous to molding in open or flash molds by heat and pressure.

As an example of a composition of the second class described, namely one which is transformed by heat into an infusible, insoluble state, the solution to be mixed with the filling materials may be the same as in the above example, with the addition of hexa-methylene-tetra-amin, sufficient in amount to combine with the free phenol contained in the solution. Usually from 7 to 15 parts of the hexa-methylene-tetra-amin will be required to be added to the solution after the completion of the reaction in the solution described in Example 1. I prefer, however, instead of adding such an amount of hexa-methylene-tetra-amin, for the purpose described, to increase the amount of formaldehyde in the initial reaction to an equi-molecular proportion, and subsequently to add an amount of hexa-methylene-tetra-amin less than the amount given above in Example 2, the amount of hexa-methylene-tetra-amin to be added depending on the amount of free phenol contained in the product in solution, which amount will be less than that present in the composition of Example 1.

To make an enamel or lacquer, carbon-dioxid is passed through the solution after the initial reaction described above, until a neutral reaction is given by suitable indicators. The solution is then filtered from the precipitate of calcium carbonate and after ascertaining the amount of free phenol contained in the reaction product in solution, an amount of hexa-methylene-tetra-amin sufficient to combine therewith is added. Strontium and barium oxids or hydroxids may be used in place of the lime in proportions which are chemically equivalent to the proportions given above for the lime.

In the specification and claims the phrase "substantial amount of an alkaline earth metal oxid" or the like is to be understood as meaning a sufficient amount to form a phenolate with the phenol when mixed therewith, or such an amount as will facilitate the reaction and form a water-soluble product in the reactions herein described. The "alkali metal oxids" or "alkaline earth metal oxids" referred to herein are also to be understood as including the corresponding hydroxids. Furthermore, under the name of "phenol alcohols" I mean to designate not only the first member of the series, oxy-benzyl-alcohol, but also the water-soluble homologues of the same or mixtures of these products as obtained by the above process by the treatment of commercial phenols or cresols. By the term "formaldehyde" I mean to include the polymers of formaldehyde and generally such substances as are equivalent thereto in the above described process. Likewise, when I refer to "phenol" in the claims, the homologues or derivatives thereof equivalent to the same in this process are included.

While, as above stated, my present invention chiefly comprises a process in which a product comprising phenol-alcohols is formed in water-solution with the aid of a considerable amount of an alkaline earth metal oxid, and the latter neutralized and precipitated as a water-insoluble, electrically-insulating salt, it should be noted that as a sub-process my invention comprises broadly the neutralization and precipitation by a suitable mineral acid, by the method disclosed, and the removal, of the alkaline earth metal oxid used as condensing agent in any process for forming phenolic condensation products in which an alkaline earth metal oxid is used as a condensing agent and a product soluble in a suitable solvent may be formed. For example, a resinous partial condensation product may be formed of phenol and formaldehyde with the aid of an alkaline earth metal oxid, such as calcium hydrate, which product may be soluble in alcohol and other solvents, but not in water, and in which the condensing agent may be present in a small proportion, if desired. The partial condensation product thus formed may be dissolved in a suitable solvent, such as alcohol, and the alkaline earth neutralized by a mineral acid, as described above. The acid, which may be carbonic or sulfuric, should be used in just the proportion to exactly neutralize the base, or in a little less proportion than sufficient to neutralize all of the base. An insoluble, insulating, salt will thus be precipitated out, either the carbonate or the sulfate of the alkaline earth metal used. The preferred method is to pass carbonic acid gas through the solution, in the same manner as described above in Example 1 of the process involving the water-soluble product. The salt thus precipitated which is, of course, insoluble in alcohol as well as in water, may be separated from the solution containing the condensation product, by filtration, when this is desired, as in the case of a varnish solution. Even very small proportions of the basic agent, when not converted into an insulating salt or removed, as herein described, harmfully affect the electrical insulating qualities of the product.

In another application, entitled "Method of forming phenolic condensation products" Serial No. 782,943, filed August 4, 1913, I have described and broadly claimed a process in which alcohol-soluble, water-insoluble, phenolic condensation products are formed with the aid of a basic condensing agent and the latter neutralized by a suitable acid in a suitable solution, such as alcohol, to form an electrically-insulating compound. That application, however, claims specifically the process in which the basic condensing agent used, which may be, for example, sodium hydrate or ammonia, is neutralized by a fatty acid, in which case there is no precipitation of the salt formed. Accordingly, in the present application will be claimed the process in which a mineral acid is used to precipitate out a salt of an alkaline earth metal, used as a condensing agent, from a suitable solution, which is not limited to either water or alcohol, containing a phenolic condensation product soluble therein. In the present application also will be claimed the process in which a suitable mineral acid is used, specifically carbon dioxid, to neutralize and precipitate as an insulating salt the alkaline earth employed in any process for forming an alkaline water solution of a phenolmethylene condensation product which may be dissolved in water by the aid of the alkaline earth metal oxid. This, it will be noted, covers as to these features both the process described and principally claimed herein, in which phenol-alcohols are formed by reaction of phenol and formaldehyde with a large proportion of basic condensing agent, and the process described and claimed in my application Serial No. 780,453 previously referred to, in which a phenol resin is put in alkaline water-solution and neutralized with the resultant precipitation of both the resin and an insoluble salt of the basic agent. The latter application is however limited in some of its specific claims to the use of an organic acid such as rosin as the neutralizing agent, the oxid of an alkali metal such as sodium or potassium being used as the condensing or dissolving agent in this specific case.

Having now described my invention what I claim and desire to secure by Letters Patent is as follows:

1. The process of forming a plastic substance which comprises mixing together phenol, formaldehyde, water and an alkaline earth metal oxid, causing a reaction between the phenol and formaldehyde to form a phenol-alcohol in water solution, neutralizing the solution to precipitate a non-water-soluble salt of the alkaline earth metal, and drying the mass.

2. In a process of forming a plastic substance which comprises the formation of a water-soluble product by causing phenol and a methylene-containing substance to react in the presence of an alkaline earth metal oxid, the steps which consist in neutralizing the said oxid, after the water-soluble product is formed, with a suitable mineral acid to precipitate a non-water-soluble electrically insulating salt, and drying the mass.

3. The process of forming a plastic substance which comprises causing phenol and formaldehyde to react in the presence of a substantial amount of an alkaline earth metal oxid and water to form a water-soluble product containing phenol alcohols, neutralizing the solution with a mineral acid which will form a water-insoluble insulating compound with the alkaline earth, and precipitate said compound out of the solution, and drying the mass.

4. The process of forming a plastic substance which comprises causing phenol and formaldehyde to react in the presence of a substantial amount of calcium hydrate to form a water-soluble product, neutralizing with carbonic acid and thereby precipitating calcium carbonate from the solution and drying the mass.

5. In a process of forming a plastic substance which comprises causing phenol and formaldehyde to react in the presence of a substantial amount of calcium hydrate to form a water-soluble product, the steps of neutralizing the said hydrate with carbonic acid and thereby precipitating calcium carbonate from the solution and separating the solution from the calcium carbonate by filtration.

6. The process of forming a plastic substance which consists in causing phenol and formaldehyde to react in the presence of an alkaline earth and water to form a water-soluble condensation product comprising phenol alcohols, neutralizing the solution to precipitate a non-water-soluble salt of the alkaline earth, drying the mass, and converting the same by heat treatment into a non-water-soluble body comprising a more highly condensed reaction product.

7. The process of forming a plastic substance which comprises mixing together a substantial proportion of an alkaline earth metal oxid, phenol, water and formaldehyde in a proportion not greater than equi-molecular in relation to the phenol, causing a reaction to form a water-soluble condensation product in water and free phenol, neutralizing the solution with a suitable mineral acid to precipitate a non-water-soluble salt of the alkaline earth metal, adding a methylene-containing substance, soluble in the solution, and drying the mass.

8. The process of forming a plastic substance which comprises mixing together phenol, formaldehyde, water and a substantial proportion of an alkaline earth metal oxid, causing a reaction to form a water-soluble product comprising phenol-alcohols, in water and free phenol, neutralizing the solution with a mineral acid which will form a water-insoluble compound with the alkaline earth metal, and cause said compound to precipitate out of the solution, adding a methylene-containing substance, soluble in the solution, and drying the mass.

9. The process of forming a plastic substance which consists in the formation of a phenol-alcohol in water- and phenol-solution with the aid of a substantial amount of an alkaline earth metal oxid, treating the solution to precipitate out the alkaline earth metal as a water-insoluble salt, adding a methylene-containing substance sufficient to combine with the free phenol on subsequent heat treatment, drying the mass, and converting the same by heat treatment into a non-water-soluble body comprising a more highly condensed reaction product.

10. In a process of forming a plastic substance which comprises the formation of a phenol-alcohol in water- and phenol-solution, the step which comprises adding to the solution a methylene-containing body sufficient to combine on subsequent heat treatment with the free phenol in the solution.

11. The process of forming a plastic substance which comprises causing phenol and formaldehyde to react in the presence of a substantial amount of calcium hydrate to form a water-soluble product, neutralizing with carbonic acid and thereby precipitating calcium carbonate from the solution, drying the mass, and converting the same by heat treatment into a non-water-soluble body comprising a more highly condensed reaction product.

12. In a process of forming a plastic substance which comprises causing phenol and formaldehyde to react in the presence of an alkaline earth metal oxid, to form a soluble product, the step of neutralizing a suitable solution of the same with a mineral acid which will precipitate out an insoluble, electrically-insulating salt of the alkaline earth metal, and separating the solution from the salt by filtration.

13. The process of forming a plastic substance which consists in forming an alkaline water solution of a phenol-methylene condensation product with the aid of an alkaline earth, exposing the same to carbon-dioxid gas until the mass is neutralized, and drying the mass.

14. The process of forming a plastic substance which consists in forming an alkaline water solution of a phenol-methylene condensation product with the aid of an alkaline earth, neutralizing the mass with a mineral acid, adapted to precipitate a water-insoluble electrically-insulating salt, and in a proportion calculated to leave no excess of the acid after the neutralization, and drying the mass.

This specification signed and witnessed this 1st day of August, 1913.

JONAS W. AYLSWORTH.

Witnesses:
WILLIAM A. HARDY,
FREDERICK BACHMANN.